US010498256B2

(12) United States Patent
Wu et al.

(10) Patent No.: US 10,498,256 B2
(45) Date of Patent: Dec. 3, 2019

(54) MULTI-LEVEL INVERTER WITH SYNCHRONOUS RECTIFICATION TECHNOLOGY

(71) Applicant: Vertiv Tech Co., Ltd., Shenzhen, Guangdong (CN)

(72) Inventors: Junke Wu, Guangdong (CN); Jianning Yang, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 0 days.

(21) Appl. No.: 15/819,263

(22) Filed: Nov. 21, 2017

(65) Prior Publication Data

US 2018/0145606 A1 May 24, 2018

(30) Foreign Application Priority Data

Nov. 23, 2016 (CN) .................... 2016 2 1262917 U

(51) Int. Cl.
*H02M 7/483* (2007.01)
*H02M 7/537* (2006.01)
*H02M 7/487* (2007.01)

(52) U.S. Cl.
CPC .......... *H02M 7/483* (2013.01); *H02M 7/487* (2013.01); *H02M 7/537* (2013.01)

(58) Field of Classification Search
CPC ...................................................... H02M 7/48
See application file for complete search history.

(56) References Cited

U.S. PATENT DOCUMENTS 6,205,040 B1 * 3/2001 Teichmann ............ G05F 1/618 363/137
8,288,896 B2 10/2012 Flury
2010/0219692 A1 9/2010 Flury
2013/0094260 A1 * 4/2013 Martini ................ H02M 7/483 363/97
2013/0301314 A1 11/2013 Fu et al.
2015/0263644 A1 * 9/2015 Fu .......................... H02M 7/48 363/95

FOREIGN PATENT DOCUMENTS

EP 2219287 A1 8/2010

OTHER PUBLICATIONS

Search Report regarding European Patent Application No. 17202910.0, dated Apr. 19, 2018.

* cited by examiner

*Primary Examiner* — Jue Zhang
*Assistant Examiner* — Trinh Q Dang
(74) *Attorney, Agent, or Firm* — Harness, Dickey & Pierce, P.L.C.

(57) ABSTRACT

Provided is a multi-level inverter, which includes a first bus capacitor, a second bus capacitor, a third bus capacitor, a fourth bus capacitor, a seventh switch unit, an eighth switch unit, an inverter circuit and a filtering circuit. The first bus capacitor, the second bus capacitor, the third bus capacitor and the fourth bus capacitor are connected between a positive direct current bus and a negative direct current bus in series, and a series point between the second bus capacitor and the third bus capacitor is grounded. The switch transistor of the anti-parallel diode having small on-state resistance is used in the multi-level inverter, thereby reducing power loss of the switch unit in the multi-level inverter and reducing power consumption of the circuit.

5 Claims, 9 Drawing Sheets

MULTI-LEVEL INVERTER WITH SYNCHRONOUS RECTIFICATION TECHNOLOGY

CROSS-REFERENCE TO RELATED APPLICATIONS

This application claims the benefit and priority of Chinese Application No. 201621262917.X, filed on Nov. 23, 2016, the entire disclosure of which is incorporated herein by reference.

FIELD

The present disclosure relates to the field of power electronics technology, and particularly to a multi-level inverter.

BACKGROUND

With continuous development of power electronics technology, a pulse width modulation (PWM) has been a mainstream control manner of a power electronics inverter, and is increasingly widely applied to an uninterrupted power supply (UPS), a photovoltaic inverter, a wind energy current transformer, a motor current transformer and the like.

A PWM inverter can be classified into a two-level inverter, a three-level inverter, a five-level inverter and a multi-level inverter based on the number of levels of a phase voltage outputted from the PWM inverter. In terms of implementation complexity, the five-level inverter and the multi-level inverter having more than five levels are difficult to be implemented, and the two-level inverter and the three-level inverter are mostly used in the industry currently.

The two-level inverter is easy to be implemented, and has a low cost, however, since a switch device suffers from voltage stress of a whole bus, a switch device having a high withstand voltage level is selected. The two-level inverter and the three-level inverter have a great switch loss, which limits a switch frequency of the PWM. In addition, voltages outputted by the two-level inverter and the three-level inverter have high harmonic components, which results in great volume and loss of an output filter.

FIG. 1A is a schematic structural diagram of an existing multi-level inverter, which includes a first bus capacitor C1, a second bus capacitor C2, a third bus capacitor C3, a fourth bus capacitor C4, a seventh switch unit 17, an eighth switch unit 18, an inverter circuit and a filtering circuit 10. The inverter circuit includes a first switch unit 11, a second switch unit 12, a third switch unit 13, a fourth switch unit 14, a first diode D1, a second diode D2, a third diode D3 and a fourth diode D4. A series point between the second switch unit 12 and the third switch unit 13 is connected to the filtering circuit 10. The third diode D3 and the fourth diode D4 in FIG. 1A have high on-state voltage drop, which results in high conduction loss in a circuit structure of the inverter, and that five-level operation in four quadrants cannot be realized in an inverter topology, and a high switch loss and great power consumption of the circuit.

SUMMARY

A multi-level inverter is provided according to an embodiment of the present disclosure, to solve a problem that a switch unit of an existing multi-level inverter has a high conduction loss and low conversion efficiency with synchronous rectification technology.

In order to realize the above object, a multi-level inverter is provided according to an embodiment of the present disclosure, which includes a first bus capacitor, a second bus capacitor, a third bus capacitor, a fourth bus capacitor, a seventh switch unit, an eighth switch unit, an inverter circuit and a filtering circuit. The first bus capacitor, the second bus capacitor, the third bus capacitor and the fourth bus capacitor are connected between a positive direct current bus and a negative direct current bus in series, and a series point between the second bus capacitor and the third bus capacitor is grounded. The inverter circuit includes a first switch unit, a second switch unit, a third switch unit, a fourth switch unit, a fifth switch unit, a sixth switch unit, a first diode and a second diode. The first switch unit, the second switch unit, the third switch unit and the fourth switch unit are connected between the positive direct current bus and the negative direct current bus in series in a same direction, and a series point between the second switch unit and the third switch unit is connected to the filtering circuit. The fifth switch unit is connected to a cathode of the first diode, and a non-control terminal of the fifth switch unit which is not connected to the first diode is connected to a series point between the first switch unit and the second switch unit, and an anode of the first diode is connected to the series point between the second bus capacitor and the third bus capacitor. The sixth switch unit is connected to an anode of the second diode, and a non-control terminal of the sixth switch unit which is not connected to the second diode is connected to a series point between the third switch unit and the fourth switch unit, and a cathode of the second diode is connected to the series point between the second bus capacitor and the third bus capacitor. The fifth switch unit and the sixth switch unit are switch transistors of anti-parallel diodes. A terminal of the seventh switch unit is connected to the cathode of the first diode, and a non-control terminal of the seventh switch unit which is not connected to the first diode is connected to a series point between the first bus capacitor and the second bus capacitor. A terminal of the eighth switch unit is connected to the anode of the second diode, and a non-control terminal of the eighth switch unit which is not connected to the second diode is connected to a series point between the third bus capacitor and the fourth bus capacitor.

Furthermore, any one switch unit of the first switch unit, the second switch unit, the third switch unit, the fourth switch unit, the fifth switch unit and the sixth switch unit of the inverter circuit includes a switch transistor of an anti-parallel diode.

Furthermore, the seventh switch unit includes a switch transistor of an anti-parallel diode.

Furthermore, the eighth switch unit includes a switch transistor of an anti-parallel diode.

Furthermore, the filtering circuit includes an energy storage inductor and a fifth capacitor, the energy storage inductor and the fifth capacitor are connected in series, a terminal of the energy storage inductor which is not connected to the fifth capacitor is connected to a series point between the second switch unit and the third switch unit, and a terminal of the fifth capacitor which is not connected to the energy storage inductor is connected to 0V.

The multi-level inverter is provided according to the embodiment of the present disclosure, which includes: a first bus capacitor, a second bus capacitor, a third bus capacitor, a four bus capacitor, a seventh switch unit, an eighth switch unit, an inverter circuit and a filtering circuit. The first bus capacitor, the second bus capacitor, the third bus capacitor and the fourth bus capacitor are connected between a positive direct current bus and a negative direct current bus in series, and a series point between the second bus capacitor and the third bus capacitor is grounded. The inverter circuit includes a first switch unit, a second switch unit, a third switch unit, a fourth switch unit, a fifth switch unit, a sixth switch unit, a first diode and a second diode. The first switch unit, the second switch unit, the third switch unit and the fourth switch unit are connected between the positive direct current bus and the negative direct current bus in series in a same direction, and a series point between the second switch unit and the third switch unit is connected to the filtering circuit. The fifth switch unit is connected to a cathode of the first diode, and a non-control terminal of the fifth switch unit which is not connected to the first diode is connected to a series point between the first switch unit and the second switch unit, and an anode of the first diode is connected to the series point between the second bus capacitor and the third bus capacitor. The sixth switch unit is connected to an anode of the second diode, and a non-control terminal of the sixth switch unit which is not connected to the second diode is connected to a series point between the third switch unit and the fourth switch unit, and a cathode of the second diode is connected to a series point between the second bus capacitor and the third bus capacitor. The fifth switch unit and the sixth switch unit are switch transistors of anti-parallel diodes. A terminal of the seventh switch unit is connected to the cathode of the first diode, and a non-control terminal of the seventh switch unit which is not connected to the first diode is connected to a series point between the first bus capacitor and the second bus capacitor. A terminal of the eighth switch unit is connected to the anode of the second diode, and a non-control terminal of the eighth switch unit which is not connected to the second diode is connected to a series point between the third bus capacitor and the fourth bus capacitor. The switch transistor of the anti-parallel diode having small power consumption is used in the multi-level inverter according to the present disclosure, thereby reducing power loss of the switch unit in the multi-level inverter and reducing power consumption of the circuit.

BRIEF DESCRIPTION OF THE DRAWINGS

In order to more clearly illustrate the present disclosure, in the following, drawings required in the description of the embodiments or the conventional technology will be introduced simply. Apparently, the drawings in the following description are some embodiments of the present disclosure. For those skilled in the art, other drawings can also be obtained according to the drawings without any creative work.

DETAILED DESCRIPTION OF THE EMBODIMENTS

In order to reduce power loss of a switch unit in a multi-level inverter, and therefore reduce power consumption of a circuit, a multi-level inverter is provided according to the present disclosure.

Hereinafter, the technical solution in the embodiments of the present disclosure will be described clearly and completely in conjunction with the drawings in the embodiments of the present disclosure. Apparently, the described embodiments are only a part of the embodiments of the present disclosure, rather than all the embodiments. All the other embodiments obtained by those skilled in the art based on the embodiments of the present disclosure without creative work will fall within the protection scope of the present disclosure.

Figure 1A:
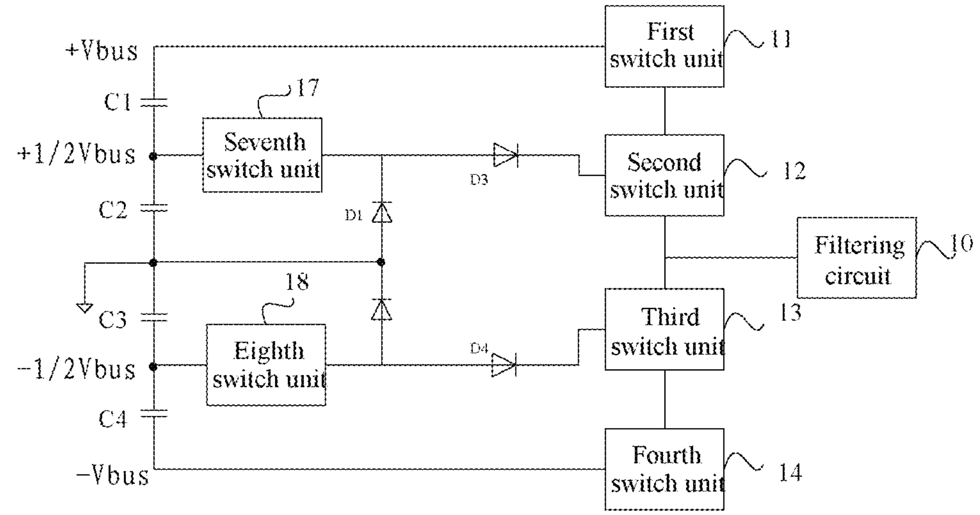
FIG. 1A is a schematic structural diagram of an existing multi-level inverter.
Figure 1B:
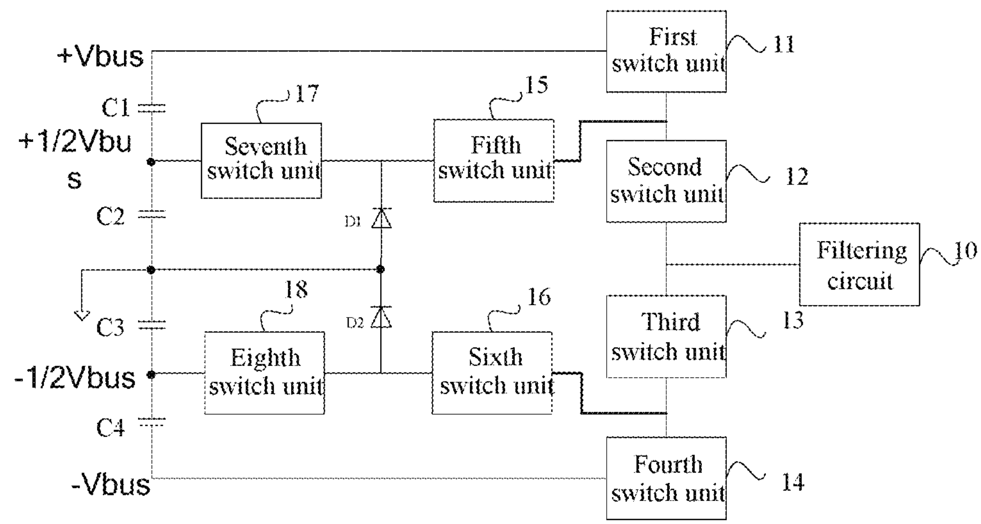
FIG. 1B is a schematic structural diagram of a multi-level inverter according to an embodiment of the present disclosure.

FIG. 1B is a schematic structural diagram of a multi-level inverter according to the present disclosure, the multi-level inverter includes a first bus capacitor C1, a second bus capacitor C2, a third bus capacitor C3, a fourth bus capacitor C4, a seventh switch unit 17, an eighth switch unit 18, an inverter circuit and a filtering circuit 10.

The first bus capacitor C1, the second bus capacitor C2, the third bus capacitor C3 and the fourth bus capacitor C4 are connected between a positive direct current bus and a negative direct current bus in series, and a series point between the second bus capacitor C2 and the third bus capacitor C3 is grounded.

The inverter circuit includes a first switch unit 11, a second switch unit 12, a third switch unit 13, a fourth switch unit 14, a fifth switch unit 15, a sixth switch unit 16, a first diode D1 and a second diode D2. The first switch unit 11, the second switch unit 12, the third switch unit 13 and the fourth switch unit 14 are connected between the positive direct current bus and the negative direct current bus in series in a same direction, and a series point between the second switch unit 12 and the third switch unit 13 are connected to the filtering circuit 10. The fifth switch unit 15 is connected to a cathode of the first diode D1, and a non-control terminal of the fifth switch unit 15 which is not connected to the first diode D1 is connected to a series point between the first switch unit 11 and the second switch unit 12, and an anode of the first diode D1 is connected to the series point between the second bus capacitor C2 and the third bus capacitor C3. The sixth switch unit 16 is connected to an anode of the second diode D2, and a non-control terminal of the sixth switch unit 16 which is not connected to the second diode D2 is connected to a series point between the third switch unit 13 and the fourth switch unit 14, and a cathode of the second diode D2 is connected to the series point between the second bus capacitor C2 and the third bus capacitor C3. The fifth switch unit and the sixth switch unit are switch transistors of anti-parallel diodes.

A terminal of the seventh switch unit 17 is connected to the cathode of the first diode D1, and a non-control terminal of the seventh switch unit 17 which is not connected to the first diode D1 is connected to a series point between the first bus capacitor C1 and the second bus capacitor C2.

A terminal of the eighth switch unit 18 is connected to the anode of the second diode D2, and a non-control terminal of the eighth switch unit 18 which is not connected to the second diode D2 is connected to a series point between the third bus capacitor C3 and the fourth bus capacitor C4.

The switch transistor of the anti-parallel diode having a small on-state resistance is used in the multi-level inverter according to the present disclosure, thereby reducing power loss of the switch unit in the multi-level inverter and reducing power consumption of the circuit.

The filtering circuit 10 may be composed of an energy storage inductor and a capacitor connected with the energy storage inductor in series, alternatively, may be composed of an energy storage inductor and a capacitor connected with the energy storage inductor in parallel, wherein the capacitor is connected with a resistor in parallel.

In order to further reduce switch power consumption of the multi-level inverter, and further reduce power consumption of the circuit, in the embodiment, optionally, the first switch unit 11 includes a switch transistor of an anti-parallel diode. Optionally, the second switch unit 12 includes a switch transistor of an anti-parallel diode. Optionally, the third switch unit 13 includes a switch transistor of an anti-parallel diode. Optionally, the fourth switch unit 14 includes a switch transistor of an anti-parallel diode.

Figure 2:
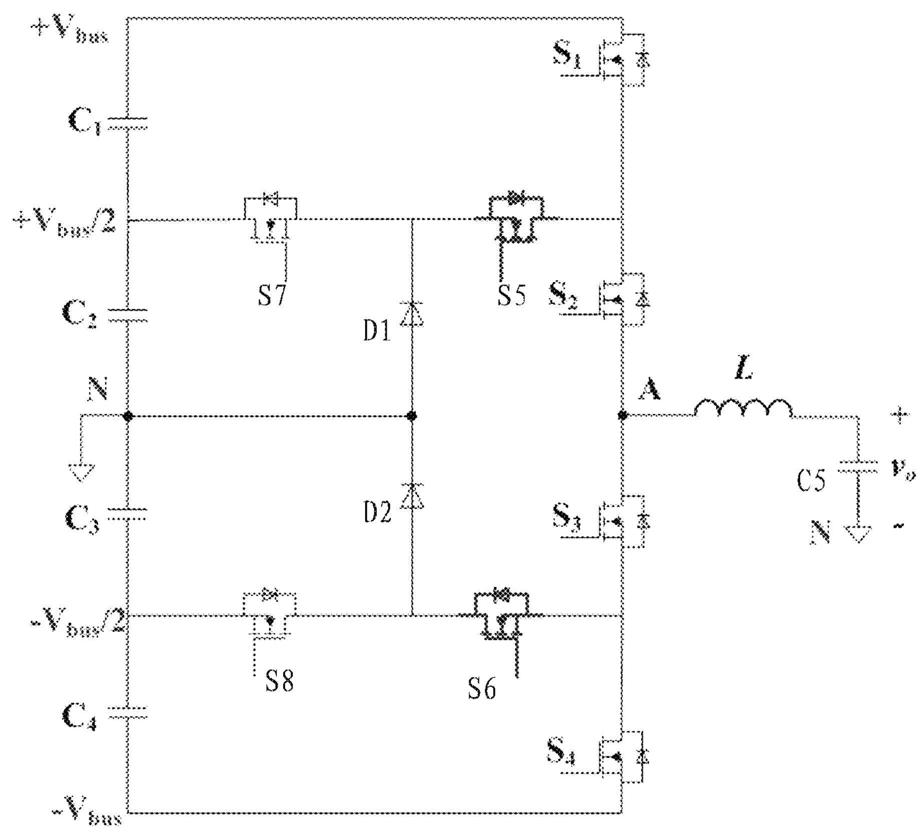
FIG. 2 is a schematic structural diagram of a multi-level inverter according to an embodiment of the present disclosure.

In a case that the first switch unit, the second switch unit, the third switch unit and the fourth switch unit are switch transistors of the anti-parallel diodes, a schematic structural diagram of the multi-level inverter is as shown in FIG. 2.

In FIG. 2, the first switch unit 11 is a switch transistor S1 of an anti-parallel diode, the second switch unit 12 is a switch transistor S2 of an anti-parallel diode, the third switch unit 13 is a switch transistor S3 of an anti-parallel diode, the fourth switch unit 14 is a switch transistor S4 of an anti-parallel diode, the fifth switch unit 15 is a switch transistor S5 of an anti-parallel diode, and the sixth switch unit 16 is a switch transistor S6 of an anti-parallel diode.

The inverter circuit is composed of the switch transistor S1 of the anti-parallel diode, the switch transistor S2 of the anti-parallel diode, the switch transistor S3 of the anti-parallel diode, the switch transistor S4 of the anti-parallel diode, the switch transistor S5 of the anti-parallel diode, the switch transistor S6 of the anti-parallel diode, the first diode D1 and the second diode D2.

The switch transistor S1 of the anti-parallel diode, the switch transistor S2 of the anti-parallel diode, the switch transistor S3 of the anti-parallel diode and the switch transistor S4 of the anti-parallel diode are connected between the positive direct current bus and the negative direct current bus in series in a same direction. A series point between the switch transistor S2 of the anti-parallel diode and the switch transistor S3 of the anti-parallel diode is connected to the filtering circuit 10. The switch transistor S5 of the anti-parallel diode is connected to a cathode of the first diode D1, and a non-control terminal of the switch transistor S5 of the anti-parallel diode which is not connected to first diode D1 is connected to a series point between the switch transistor S1 of the anti-parallel diode and the switch transistor S2 of the anti-parallel diode, and an anode of the first diode D1 is connected to the series point between the second bus capacitor C2 and the third bus capacitor C3. The switch transistor S6 of the anti-parallel diode is connected to an anode of the second diode D2, and a non-control terminal of the switch transistor S6 of the anti-parallel diode which is not connected to the second diode D2 is connected to a series point between the switch transistor S3 of the anti-parallel diode and the switch transistor S4 of the anti-parallel diode, and a cathode of the second diode D2 is connected to the series point between the second bus capacitor C2 and the third bus capacitor C3.

The seventh switch unit 17 includes a switch transistor S7 of an anti-parallel diode.

The eighth switch unit 18 includes a switch transistor S8 of an anti-parallel diode.

The filtering circuit 10 includes an energy storage inductor L and a fifth capacitor C5.

The energy storage inductor L and the fifth capacitor C5 are connected in series.

A terminal of the energy storage inductor L which is not connected to the fifth capacitor C5 is connected to a series point between the second switch unit 12 and the third switch unit 13.

A terminal of the fifth capacitor C5 which is not connected to the energy storage inductor L is connected to 0V.

A terminal of the energy storage inductor L which is not connected to the fifth capacitor C5 is connected to the series point between the second switch unit 12 and the third switch unit 13, that is, to the series point between the switch transistor S2 of the anti-parallel diode and the switch transistor S3 of the anti-parallel diode.

In the embodiments of the present disclosure, pulsating voltages of connection points connected to the switch transistor S1 of the anti-parallel diode, the switch transistor S2 of the anti-parallel diode, the switch transistor S3 of the anti-parallel diode and the switch transistor S4 of the anti-parallel diode includes five levels, which are +Vbus, +½Vbus, 0, −½Vbus and −Vbus. Vbus is a half-bus voltage.

Figure 3:
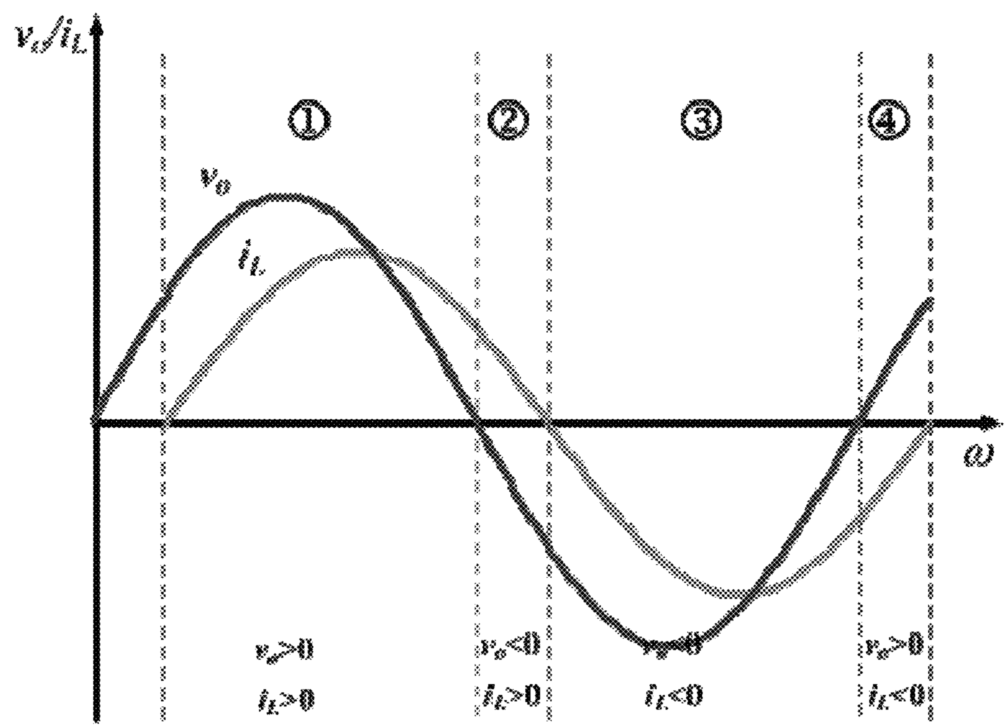
FIG. 3 is a schematic diagram showing a current and a voltage outputted from a band-stop inductive load in an inverter topology of a multi-level inverter according to the embodiment of the present disclosure.

A current in a power frequency period can be divided into a quadrant I, a quadrant II, a quadrant III and a quadrant IV based on a voltage and a current outputted from a band-stop inductive load in an inverter topology shown in FIG. 3.

In the quadrant I, a voltage outputted in the inverter topology shown in FIG. 3 is greater than 0, and a current outputted in the inverter topology shown in FIG. 3 is less than 0 (that is, the current flows from a right side of the energy storage inductor L to a left side of the energy storage inductor L). In the quadrant II, a voltage outputted in the inverter topology shown in FIG. 3 is greater than 0, and a current outputted in the inverter topology shown in FIG. 3 is greater than 0 (that is, the current flows from the right side of the energy storage inductor L to the left side of the energy storage inductor L). In the quadrant III, a voltage outputted in the inverter topology shown in FIG. 3 is less than 0, and a current outputted in the inverter topology shown in FIG. 3 is greater than 0. In the quadrant IV, a voltage outputted in the inverter topology shown in FIG. 3 is less than 0, and a current outputted in the inverter topology shown in FIG. 3 is less than 0.

Figure 4:
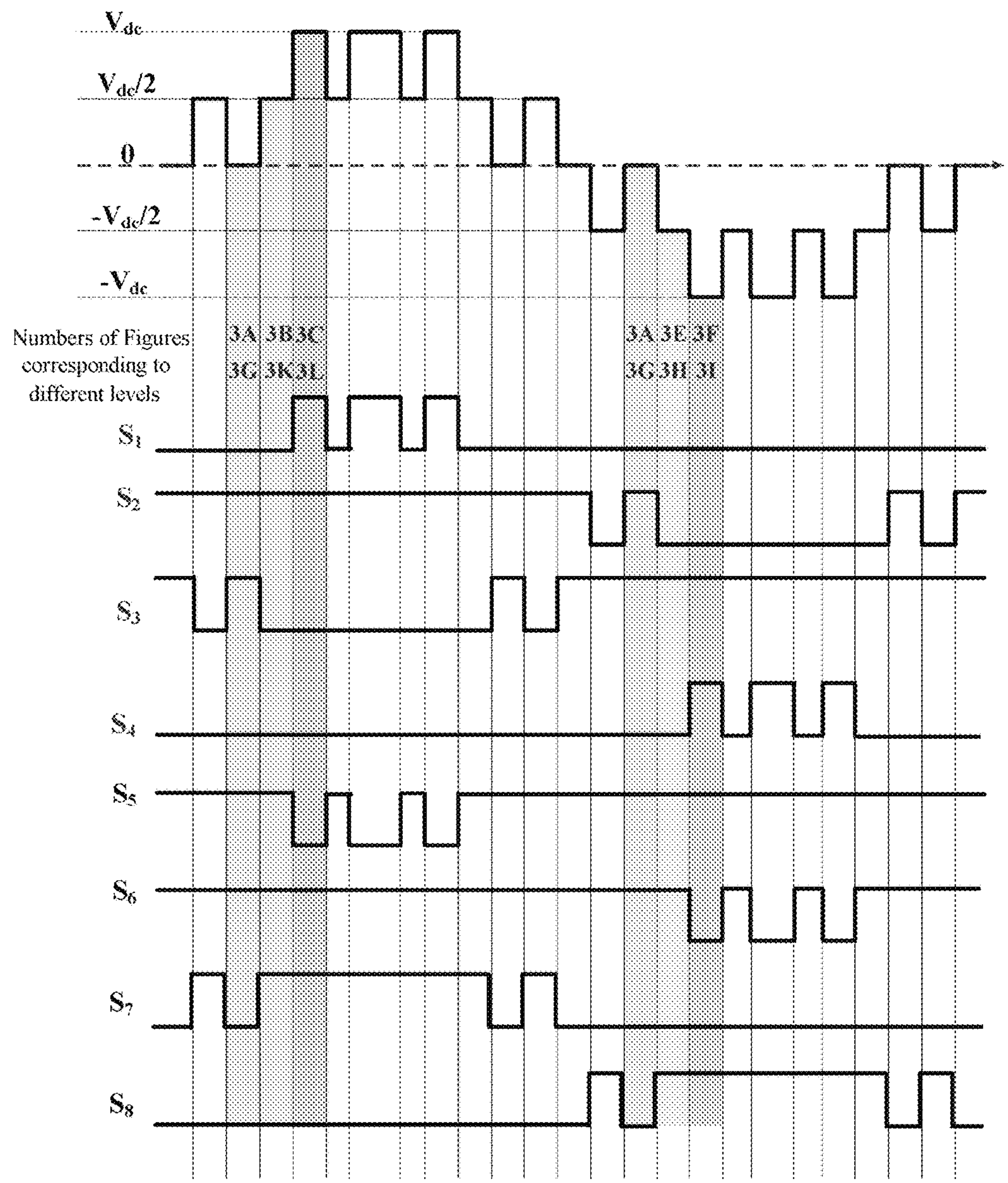
FIG. 4 is a timing diagram of the multi-level inverter shown in FIG. 2.

The switch transistor S1 of the anti-parallel diode, the switch transistor S2 of the anti-parallel diode, the switch transistor S3 of the anti-parallel diode, the switch transistor S4 of the anti-parallel diode, the switch transistor S7 of the anti-parallel diode and the switch transistor S8 of the anti-parallel diode in the multi-level inverter have a same drive timing circuit as the existing drive circuit. Drive timing circuits of the switch transistor S5 of the anti-parallel diode and the switch transistor S6 of the anti-parallel diode are as shown in FIG. 4.

Figure 3A:
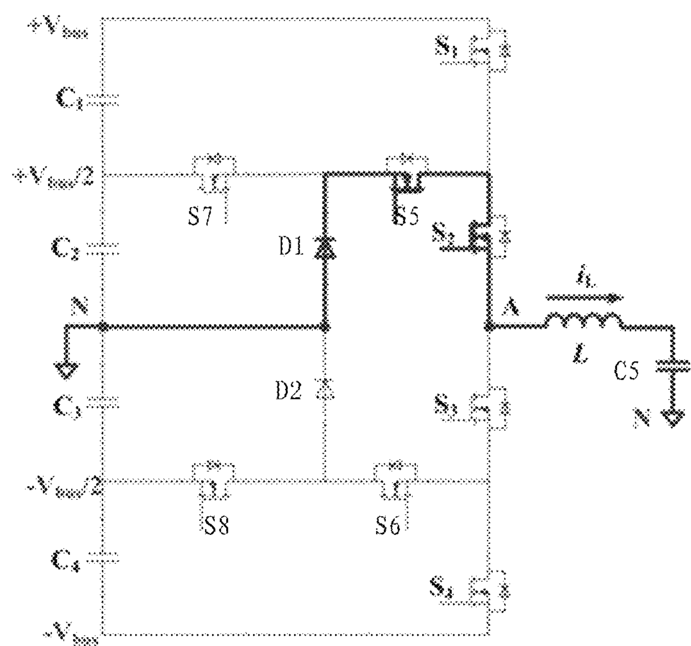
FIG. 3A is a schematic diagram showing a current path of the multi-level inverter shown in FIG. 2 in a mode 1 of a first quadrant.
Figure 3B:
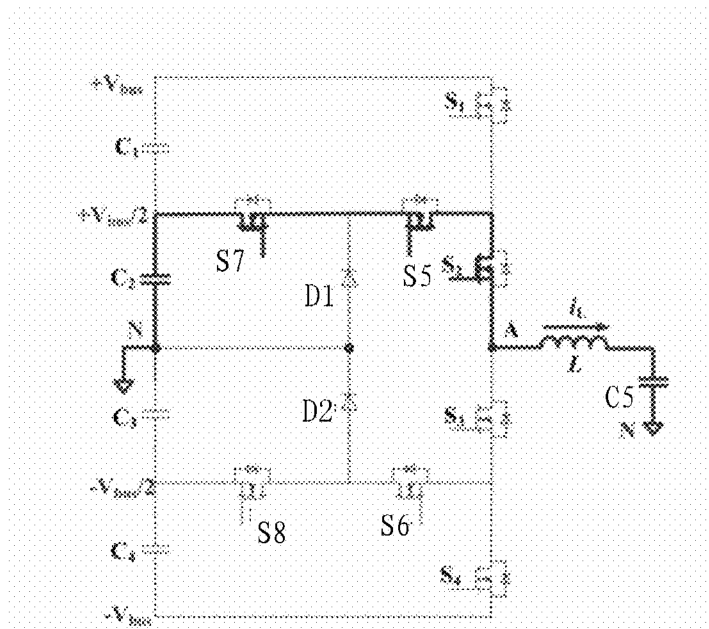
FIG. 3B is a schematic diagram showing a current path of the multi-level inverter shown in FIG. 2 in a mode 2 of a first quadrant.
Figure 3C:
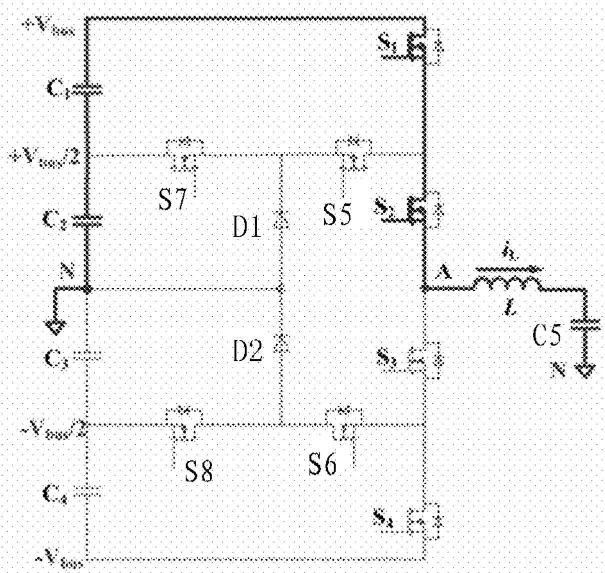
FIG. 3C is a schematic diagram showing a current path of the multi-level inverter shown in FIG. 2 in a mode 3 of a first quadrant.

A flow path of the current outputted in the inverter topology shown in FIG. 3 in a first quadrant is as shown in FIG. 3A, FIG. 3B and FIG. 3C. FIG. 3A is a schematic diagram showing a current path of the multi-level inverter in a mode 1 of the first quadrant, a direction of an output current of a point A in the mode 1 is as shown in FIG. 3A, the switch transistor S5 of the anti-parallel diode is controlled to operate in a synchronous rectifying state, an output voltage of the point A is 0V, and the switch transistor S5 of the anti-parallel diode is turned on, the switch transistor S2 of the anti-parallel diode is turned on, the switch transistor S1 of the anti-parallel diode is not turned on, the switch transistor S4 of the anti-parallel diode is not turned on, and the switch transistor S8 of the anti-parallel diode is not turned on. Therefore, the current, flowing through the first diode D1, the switch transistor S5 of the anti-parallel diode, the switch transistor S2 of the anti-parallel diode, the energy storage inductor L and the capacitor C5, forms a freewheeling circuit.

FIG. 3B is a schematic diagram showing a current path of the multi-level inverter in a mode 2 of the first quadrant, a direction of an output current of the point A in the mode 2 is as shown in FIG. 3B, the switch transistor S5 of the anti-parallel diode is controlled to operate in a synchronous rectifying state, an output voltage of the point A is +½Vbus, Vbus is a half-bus voltage, and 2Vbus is a bus voltage. The switch transistor S2 of the anti-parallel diode is turned on, the switch transistor S5 of the anti-parallel diode and the switch transistor S7 of the anti-parallel diode are turned on, the switch transistor S1 of the anti-parallel diode and the switch transistor S3 of the anti-parallel diode are not turned on. Therefore, the current flowing through the second bus capacitor C2, the switch transistor S7 of the anti-parallel diode, the switch transistor S5 of the anti-parallel diode, the switch transistor S2 of the anti-parallel diode, the energy storage inductor L and the capacitor C5, forms a freewheeling circuit.

FIG. 3C is a schematic diagram showing a current path of the multi-level inverter in a mode 3 of the first quadrant, a direction of an output current of the point A in the mode 3 is as shown in FIG. 3C, an output voltage of the point A is +Vbus, Vbus is a half-bus voltage, and 2Vbus is a bus voltage. The switch transistor S1 of the anti-parallel diode is turned on, the switch transistor S2 of the anti-parallel diode is turned on, the switch transistor S7 of the anti-parallel diode is not turned on, and the switch transistor S3 of the anti-parallel diode is not turned on. Therefore, the current, flowing through the second bus capacitor C2, the first bus capacitor C1, the switch transistor S1 of the anti-parallel diode, the switch transistor S2 of the anti-parallel diode, the energy storage inductor L and the capacitor C5, forms a freewheeling circuit.

Figure 3E:
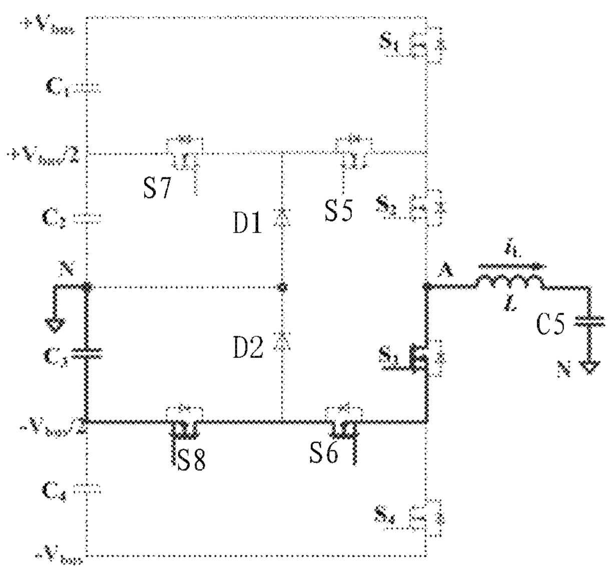
FIG. 3E is a schematic diagram showing a current path of the multi-level inverter shown in FIG. 2 in a mode 2 of a second quadrant.
Figure 3F:
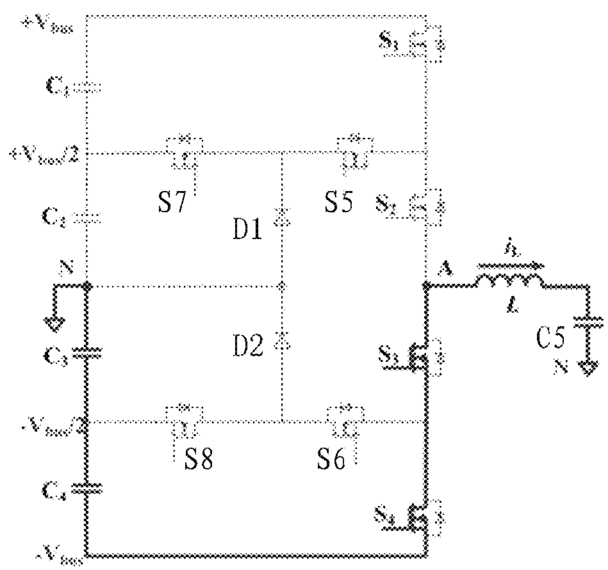
FIG. 3F is a schematic diagram showing a current path of the multi-level inverter shown in FIG. 2 in a mode 3 of a second quadrant.

A flow path of a current outputted in the inverter topology shown in FIG. 3 in a second quadrant is as shown in FIG. 3E and FIG. 3F, a schematic diagram of a current path in a mode 1 of a second quadrant is the same as FIG. 3A, a direction of an output current of the point A in the mode 1 is as shown in FIG. 3A, the switch transistor S5 of the anti-parallel diode is controlled to operate in a synchronous rectifying state, an output voltage of the point A is 0V, and the current, flowing through the first diode D1, the switch transistor S5 of the anti-parallel diode, the switch transistor S2 of the anti-parallel diode, the energy storage inductor L and the capacitor C5, forms a freewheeling circuit. In this case, the switch transistor S5 of the anti-parallel diode operates in the synchronous rectifying state.

FIG. 3E is a schematic diagram showing a current path of the multi-level inverter in a mode 2 of the second quadrant, a direction of an output current of the point A in the mode 2 is as shown in FIG. 3E, the switch transistor S8 of the anti-parallel diode and the switch transistor S3 of the anti-parallel diode are controlled to operate in a synchronous rectifying state, an output voltage of the point A is −½Vbus, Vbus is a half-bus voltage, and 2Vbus is a bus voltage. The switch transistor S8 of the anti-parallel diode is turned on, the switch transistor S6 of the anti-parallel diode is turned on, and the switch transistor S3 of the anti-parallel diode is turned on, the switch transistor S2 of the anti-parallel diode is not turned on, and the switch transistor S4 of the anti-parallel diode is not turned on. Therefore, the current, flowing through the third bus capacitor C3, the switch transistor S8 of the anti-parallel diode, the switch transistor S6 of the anti-parallel diode, the switch transistor S3 of the anti-parallel diode, the energy storage inductor L and the capacitor C5, forms a freewheeling circuit.

FIG. 3F is a schematic diagram showing a current path of the multi-level inverter in a mode 3 of the second quadrant, a direction of an output current of the point A in the mode 3 is as shown in FIG. 3F, the switch transistor S4 of the anti-parallel diode and the switch transistor S3 of the anti-parallel diode are controlled to operate in a synchronous rectifying state, an output voltage of the point A is −Vbus, Vbus is a half-bus voltage, and 2Vbus is a bus voltage. The switch transistor S3 of the anti-parallel diode and the switch transistor S4 of the anti-parallel diode are controlled to be turned on, and the switch transistor S2 of the anti-parallel diode is not turned on, and therefore, the current flowing through the third bus capacitor C3, the fourth bus capacitor C4, the switch transistor S4 of the anti-parallel diode, the switch transistor S3 of the anti-parallel diode, the energy storage inductor and the capacitor C5 forms a freewheeling circuit. In this case, the switch transistor S4 of the anti-parallel diode and the switch transistor S3 of the anti-parallel diode operate in the synchronous rectifying state.

Figure 3G:
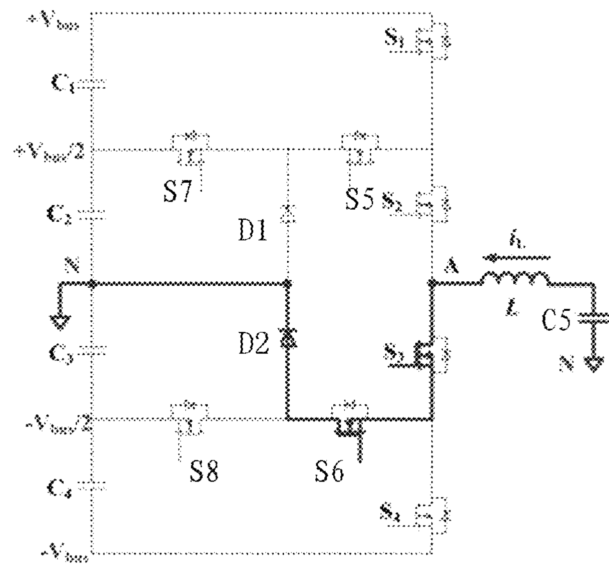
FIG. 3G is a schematic diagram showing a current path of the multi-level inverter shown in FIG. 2 in a mode 1 of a third quadrant.
Figure 3H:
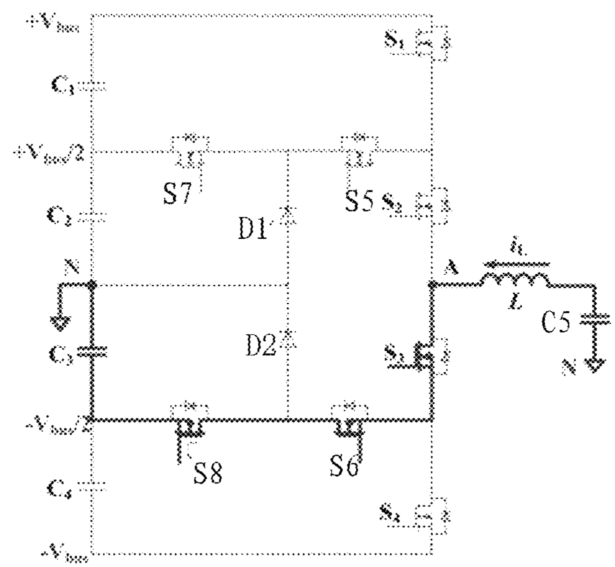
FIG. 3H is a schematic diagram showing a current path of the multi-level inverter shown in FIG. 2 in a mode 2 of a third quadrant.
Figure 3I:
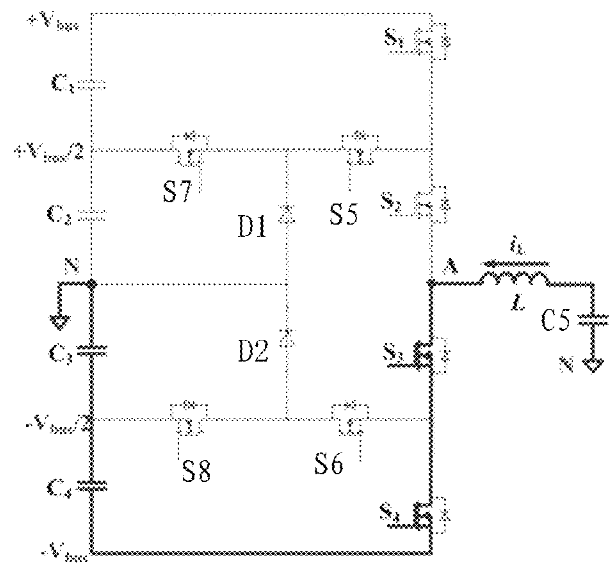
FIG. 3I is a schematic diagram showing a current path of the multi-level inverter shown in FIG. 2 in a mode 3 of a third quadrant.

A flow path of a current outputted in the inverter topology shown in FIG. 3 in a third quadrant is shown in FIG. 3G, FIG. 3H and FIG. 3I. FIG. 3G is a schematic diagram showing a current path of the multi-level inverter in a mode 1 of the third quadrant, a direction of an output current of the point A in the mode 1 is as shown in FIG. 3G, the switch transistor S6 of the anti-parallel diode is controlled to operate in a synchronous rectifying state, an output voltage of the point A is 0V, the switch transistor S1 of the anti-parallel diode is not turned on, and the switch transistor S7 of the anti-parallel diode is not turned on, the switch transistor S3 of the anti-parallel diode is turned on, and the switch transistor S6 of the anti-parallel diode is turned on, and therefore, the current flowing through the capacitor C5, the energy storage inductor L, the switch transistor S3 of the anti-parallel diode, the switch transistor S6 of the anti-parallel diode and the second diode D2 forms a freewheeling circuit.

FIG. 3H is a schematic diagram showing a current path of the multi-level inverter in a mode 2 of the third quadrant, a direction of an output current of the point A in the mode 2 is as shown in FIG. 3H, the switch transistor S6 of the anti-parallel diode is controlled to operate in a synchronous rectifying state, an output voltage of the point A is −½Vbus, Vbus is a half-bus voltage, and 2Vbus is a bus voltage. The switch transistor S2 of the anti-parallel diode is not turned on, the switch transistor S3 of the anti-parallel diode, the switch transistor S6 of the anti-parallel diode and the switch transistor S8 of the anti-parallel diode are turned on, and therefore, the current flowing through the capacitor C5, the energy storage inductor, the switch transistor S3 of the anti-parallel diode, the switch transistor S6 of the anti-parallel diode, the switch transistor S8 of the anti-parallel diode and the third bus capacitor C3 forms a freewheeling circuit.

FIG. 3I is a schematic diagram showing a current path of the multi-level inverter in a mode 3 of the third quadrant, a direction of an output current of the point A in the mode 3 is as shown in FIG. 3I, an output voltage of the point A is −Vbus, Vbus is a half-bus voltage, and 2Vbus is a bus voltage. The switch transistor S2 of the anti-parallel diode is not turned on, the switch transistor S3 of the anti-parallel diode and the switch transistor S4 of the anti-parallel diode are turned on, and therefore, the current flowing through the capacitor C5, the energy storage inductor L, the switch transistor S3 of the anti-parallel diode, the switch transistor S4 of the anti-parallel diode, the fourth bus capacitor C4 and the third bus capacitor C3 forms a freewheeling circuit.

Figure 3K:
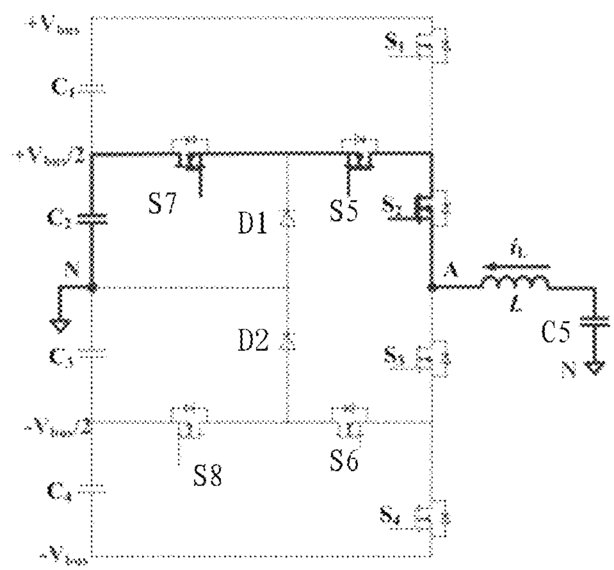
FIG. 3K is a schematic diagram showing a current path of the multi-level inverter shown in FIG. 2 in a mode 2 of a fourth quadrant.
Figure 3L:
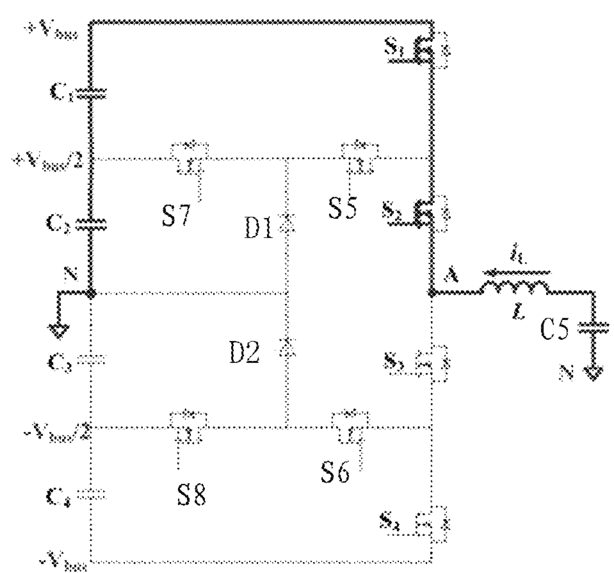
FIG. 3L is a schematic diagram showing a current path of the multi-level inverter shown in FIG. 2 in a mode 3 of a fourth quadrant.

A flow path of a current outputted in the inverter topology shown in FIG. 3 in a fourth quadrant is shown in FIG. 3K and FIG. 3L, a schematic diagram of a current path in a mode 1 of the fourth quadrant is the same as FIG. 3G, a direction of an output current of the point A in the mode 1 is as shown in FIG. 3G, the switch transistor S6 of the anti-parallel diode is controlled to operate in a synchronous rectifying state, an output voltage of the point A is 0V, and the current flowing through the capacitor C5, the energy storage inductor L, the switch transistor S3 of the anti-parallel diode, the switch transistor S6 of the anti-parallel diode and the second diode D2 forms a freewheeling circuit.

FIG. 3K is a schematic diagram showing a current path of the multi-level inverter shown in FIG. 2 in a mode 2 of the fourth quadrant, a direction of an output current of the point A in the mode 2 is as shown in FIG. 3K, the switch transistor S8 of the anti-parallel diode and the switch transistor S3 of the anti-parallel diode are controlled to operate in a synchronous rectifying state, an output voltage of the point A is +½Vbus, Vbus is a half-bus voltage, and 2Vbus is a bus voltage. The switch transistor S2 of the anti-parallel diode is turned on, the switch transistor S5 of the anti-parallel diode and the switch transistor S7 of the anti-parallel diode are turned on, the switch transistor S1 of the anti-parallel diode is not turned on, and the switch transistor S3 of the anti-parallel diode is not turned on. Therefore, the current flowing through the capacitor C5, the energy storage inductor L, the switch transistor S2 of the anti-parallel diode, the switch transistor S5 of the anti-parallel diode, the switch transistor S7 of the anti-parallel diode and the second bus capacitor C2 forms a freewheeling circuit. In this case, the switch transistor S2 of the anti-parallel diode and the switch transistor S7 of the anti-parallel diode operate in a synchronous rectifying state.

FIG. 3L is a schematic diagram showing a current path of the multi-level inverter shown in FIG. 2 in a mode 3 of the fourth quadrant, a direction of an output current of the point A in the mode 3 is as shown in FIG. 3L, an output voltage of the point A is +Vbus, Vbus is a half-bus voltage, and 2Vbus is a bus voltage. The switch transistor S1 of the anti-parallel diode is turned on, the switch transistor S2 of the anti-parallel diode is turned on, the switch transistor S7 of the anti-parallel diode is not turned on, and the switch transistor S3 of the anti-parallel diode is not turned on. Therefore, the current flowing through the capacitor C5, the energy storage inductor L, the switch transistor S2 of the anti-parallel diode, the switch transistor S1 of the anti-parallel diode, the first bus capacitor C1 and the second bus capacitor C2 forms a freewheeling circuit.

The multi-level inverter is provided according to the embodiment of the present disclosure, which includes: a first bus capacitor, a second bus capacitor, a third bus capacitor, a four bus capacitor, a seventh switch unit, an eighth switch unit, an inverter circuit and a filtering circuit. The first bus capacitor, the second bus capacitor, the third bus capacitor and the fourth bus capacitor are connected between a positive direct current bus and a negative direct current bus in series, and a series point between the second bus capacitor and the third bus capacitor is grounded. The inverter circuit includes a first switch unit, a second switch unit, a third switch unit, a fourth switch unit, a fifth switch unit, a sixth switch unit, a first diode and a second diode. The first switch unit, the second switch unit, the third switch unit and the fourth switch unit are connected between the positive direct current bus and the negative direct current bus in series in a same direction, and a series point between the second switch unit and the third switch unit is connected to the filtering circuit. The fifth switch unit is connected to a cathode of the first diode, and a non-control terminal of the fifth switch unit which is not connected to the first diode is connected to a series point between the first switch unit and the second switch unit, and an anode of the first diode is connected to a series point between the second bus capacitor and the third bus capacitor. The sixth switch unit is connected to an anode of the second diode, and a non-control terminal of the sixth switch unit which is not connected to the second diode is connected to a series point between the third switch unit and the fourth switch unit, and a cathode of the second diode is connected to a series point between the second bus capacitor and the third bus capacitor. The fifth switch unit and the sixth switch unit are switch transistors of anti-parallel diodes. A terminal of the seventh switch unit is connected to the cathode of the first diode, and a non-control terminal of the seventh switch unit which is not connected to the first diode is connected to a series point between the first bus capacitor and the second bus capacitor. A terminal of the eighth switch unit is connected to the anode of the second diode, and a non-control terminal of the eighth switch unit which is not connected to the second diode is connected to a series point between the third bus capacitor and the fourth bus capacitor. The switch transistor of the anti-parallel diode having small on-state resistance is used in the multi-level inverter according to the present disclosure, thereby reducing power loss of the switch unit in the multi-level inverter and reducing power consumption of the circuit.

Preferred embodiments of the present disclosure are described above, however, those skilled in the art can make additional alterations and changes onto these embodiments once acquiring base inventive concept. The appended claims are interpreted to include the preferred embodiments and all alterations and changes within the scope of the present disclosure.

Apparently, those skilled in the art can make various changes and modifications on the present disclosure without departing from the spirit and scope of the present disclosure, in this case, the present disclosure is intended to contain the changes and modifications if the changes and modifications of the present disclosure fall within a scope of the claims of the present disclosure and equivalent technology thereof.

The invention claimed is:

1. A multi-level inverter with synchronous rectification technology comprising:

a first bus capacitor;

a second bus capacitor;

a third bus capacitor;

a fourth bus capacitor;

a seventh switch unit;

an eighth switch unit;

an inverter circuit; and a filtering circuit, wherein:

the first bus capacitor, the second bus capacitor, the third bus capacitor and the fourth bus capacitor are connected between a positive direct current bus and a negative direct current bus in series, a series point between the second bus capacitor and the third bus capacitor is grounded, the inverter circuit comprises a first switch unit, a second switch unit, a third switch unit, a fourth switch unit, a fifth switch unit, a sixth switch unit, a first diode and a second diode, the first switch unit, the second switch unit, the third switch unit and the fourth switch unit are connected between the positive direct current bus and the negative direct current bus in series in a same direction, a series point between the second switch unit and the third switch unit is connected to the filtering circuit, the fifth switch unit is connected to a cathode of the first diode, a non-control terminal of the fifth switch unit that is not connected to the first diode is connected to a series point between the first switch unit and the second switch unit, an anode of the first diode is connected to the series point between the second bus capacitor and the third bus capacitor, the sixth switch unit is connected to an anode of the second diode, a non-control terminal of the sixth switch unit that is not connected to the second diode is connected to a series point between the third switch unit and the fourth switch unit, a cathode of the second diode is connected to the series point between the second bus capacitor and the third bus capacitor, the fifth switch unit and the sixth switch unit are switch transistors with anti-parallel diodes having a small on-state resistance, so as to reduce power loss of the fifth switch unit and the sixth switch unit in the multi-level inverter, a terminal of the seventh switch unit is connected to the cathode of the first diode, a non-control terminal of the seventh switch unit that is not connected to the first diode is connected to a series point between the first bus capacitor and the second bus capacitor, a terminal of the eighth switch unit is connected to the anode of the second diode, and a non-control terminal of the eighth switch unit that is not connected to the second diode is connected to a series point between the third bus capacitor and the fourth bus capacitor.

2. The multi-level inverter according to claim 1, wherein any one switch unit of the first switch unit, the second switch unit, the third switch unit and the fourth switch unit of the inverter circuit comprises a switch transistor with an anti-parallel diode.

3. The multi-level inverter according to claim 1, wherein the seventh switch unit comprises a switch transistor with an anti-parallel diode.

4. The multi-level inverter according to claim 1, wherein the eighth switch unit comprises a switch transistor with an anti-parallel diode.

5. The multi-level inverter according to claim 1, wherein:

the filtering circuit comprises an energy storage inductor and a fifth capacitor;

the energy storage inductor and the fifth capacitor are connected in series;

a terminal of the energy storage inductor that is not connected to the fifth capacitor is connected to the series point between the second switch unit and the third switch unit; and a terminal of the fifth capacitor that is not connected to the energy storage inductor is connected to 0V.

* * * * *